United States Patent
François

[19]

[11] Patent Number: 6,064,932
[45] Date of Patent: May 16, 2000

[54] ASSEMBLY FOR ADJUSTING THE POSITION OF AT LEAST TWO MOTOR VEHICLE COMPONENTS

[75] Inventor: Fourrey François, Nogent sur Vernisson, France

[73] Assignee: Cesa-Campagnie Eurpeene de Sieges pour Automobiles, Levallois Perre, France

[21] Appl. No.: 08/983,424

[22] PCT Filed: Jul. 24, 1996

[86] PCT No.: PCT/FR96/01168

§ 371 Date: May 19, 1998

§ 102(e) Date: May 19, 1998

[87] PCT Pub. No.: WO97/04985

PCT Pub. Date: Feb. 13, 1997

[30] Foreign Application Priority Data

Jul. 25, 1995 [FR] France .................................. 95 09021

[51] Int. Cl.[7] ...................................... B60N 2/02
[52] U.S. Cl. ................ 701/49; 701/36; 340/438
[58] Field of Search ........................ 701/36, 49; 340/438

[56] References Cited

U.S. PATENT DOCUMENTS

| 4,204,255 | 5/1980 | Cremer ..................................... 364/425 |
| 4,655,505 | 4/1987 | Kashiwamura et al. ................ 297/284 |
| 4,809,180 | 2/1989 | Saitoh ....................................... 701/36 |
| 4,833,614 | 5/1989 | Saitoh et al. ............................... 701/36 |
| 4,967,178 | 10/1990 | Saito et al. ............................ 340/425.5 |
| 5,245,142 | 9/1993 | Sacco et al. ............................ 200/5 R |
| 5,319,248 | 6/1994 | Endou ..................................... 307/10.1 |
| 5,419,215 | 5/1995 | Herron et al. ............................ 74/493 |
| 5,555,172 | 9/1996 | Potter ........................................ 701/36 |

FOREIGN PATENT DOCUMENTS

| 199916 | 2/1986 | European Pat. Off. . |
| 2592970 | 7/1987 | France . |
| 3608818 | 9/1986 | Germany . |
| 3836019 | 4/1990 | Germany . |
| 4132499 | 1/1993 | Germany . |

Primary Examiner—Tan Nguyen
Attorney, Agent, or Firm—Sughrue, Mion, Zinn Macpeak & Seas, PLLC

[57] ABSTRACT

A basic movement may be imparted selectively to each movable component (A, D, RD, RG, V) in either of two opposite directions. For this purpose, an adjustment assembly comprises a control device (20) common to all the components to be adjusted and including component position adjusting means. The adjusting means comprise means (38) for selecting a component to be adjusted and a basic movement thereof, as well as means (40, 42) for executing the selected movement in a selected direction. The adjustment assembly further comprises means (60) for displaying data on the selected component and basic movement, and means (68) for switching the control device (20) to a movable component position adjustment mode or to a control mode for controlling at least one other non-movable means such as a radio-cassette player.

19 Claims, 4 Drawing Sheets

ASSEMBLY FOR ADJUSTING THE POSITION OF AT LEAST TWO MOTOR VEHICLE COMPONENTS

BACKGROUND OF THE INVENTION

The present invention concerns a system for adjusting the position of at least two elements of an automobile vehicle.

It applies in particular to adjusting the position of a seat cushion and a seat squab of an automobile vehicle.

Electrical means are more and more frequently used to adjust the position of the various elements constituting an automobile vehicle seat, in particular to adjust the position of the seat cushion and the seat squab.

The increase in the number of electrical adjustment means leads to an increase in the number of control switches. These switches are very often disposed at locations that the user cannot see when driving the vehicle.

What is more, the control switches are not always laid out in a logical manner evident to the user.

DE-A-36 08 818 describes a system for adjusting the position of at least two elements of an automobile vehicle of the kind in which each element is mobile in accordance with at least one elementary movement in two opposite directions at will, the adjustment system including a common control device for all the elements to be adjusted including means for adjusting the position of the elements, these adjustment means including, on the one hand, means for selecting an element to be adjusted and an elementary movement of that element and, on the other hand, means for executing the selected movement in a given direction, the adjustment system further including means for displaying information indicating the element and the elementary movement selected.

SUMMARY OF THE INVENTION

One aim of the invention is to propose means for adjusting the position of the seat cushion and the seat squab of a seat that do not have the above drawbacks and that can be controlled easily by a driver of the vehicle.

To this end, the invention consists in a system for adjusting the position of at least two elements of an automobile vehicle, of the aforementioned type, characterized in that it includes means for allocating the control device either to adjusting the position of the movable elements or to controlling at least one other non-movable element, such as a car radio.

In accordance with other features of the invention:

the elementary movements are executed by means of electromechanical drive means and the control device includes a control system including electric switches and a microprocessor unit to which the control system and the electromechanical drive means are connected, the allocation means include an electric switch connected to the microprocessor unit, the control system is disposed near the steering wheel of the vehicle or integrated into the steering wheel so that the switches can be operated by the fingers of a driver whose hands remain on the steering wheel, the selector means include an electric switch for selecting an element and an elementary movement and the means for executing the elementary movement include two electric switches each controlling one direction of execution of the elementary movement, the switches for selecting the element and the direction of movement being integrated into the control system, the adjustment system includes means imposing a logical sequence for execution of the various element position adjustments, the selector electric switch is a rotary switch with multiple indexed positions forming the means imposing a logical sequence, movement of this selector switch in the same direction successively selecting the various elements to be adjusted and their elementary movements, the two electric switches for executing an elementary movement form the means for imposing a logical sequence, simultaneous actuation of these two switches selecting successively the various elements to be adjusted and their elementary movements, the display means also indicate the direction of execution of the selected elementary movement and the position of the selected element, the display means include a screen for displaying pictograms, the control device includes means for storing at least two positions of an element and means for selecting a stored position, the storage means include an electric switch for selective recall of a memory and an electric switch for storing a position of the element in that memory, the memory recall and stored position activation switches being integrated into the control system, the means for selecting a stored position include an electric switch for selective recall of a memory and an electric switch for activating the stored position, the memory recall and the stored position activation switches being integrated into the control system, some of the switches are common to more than one of the element position adjustment means, the position storage means and the stored position selection means and the control device includes means for selective activation of the element position adjustment means, the position storage means and the stored position selection means, the selective activation means include an electric switch integrated into the control system, the adjustment system includes means for positioning at least one element in a standard position including an electric switch connected to the microprocessor unit, the adjustment system includes means for selecting a pulsed or continuous depression operating mode of the stored position activation switch, said operating mode selector means including a safety electric switch connected to the microprocessor unit, the safety switch is actuated by a handbrake of the vehicle, the allocation means include an electric switch connected to the microprocessor unit, the elements to be adjusted include seat elements such as a seat cushion and a seat squab, the logical sequence includes in succession longitudinal adjustment of the seat cushion, adjustment of the inclination of the seat squab and vertical adjustment of the seat cushion.

The invention will be better understood from a reading of the following description given by way of example only and with reference to the accompanying drawings, in which:

DESCRIPTION OF PREFERRED EMBODIMENTS

Figure 1:
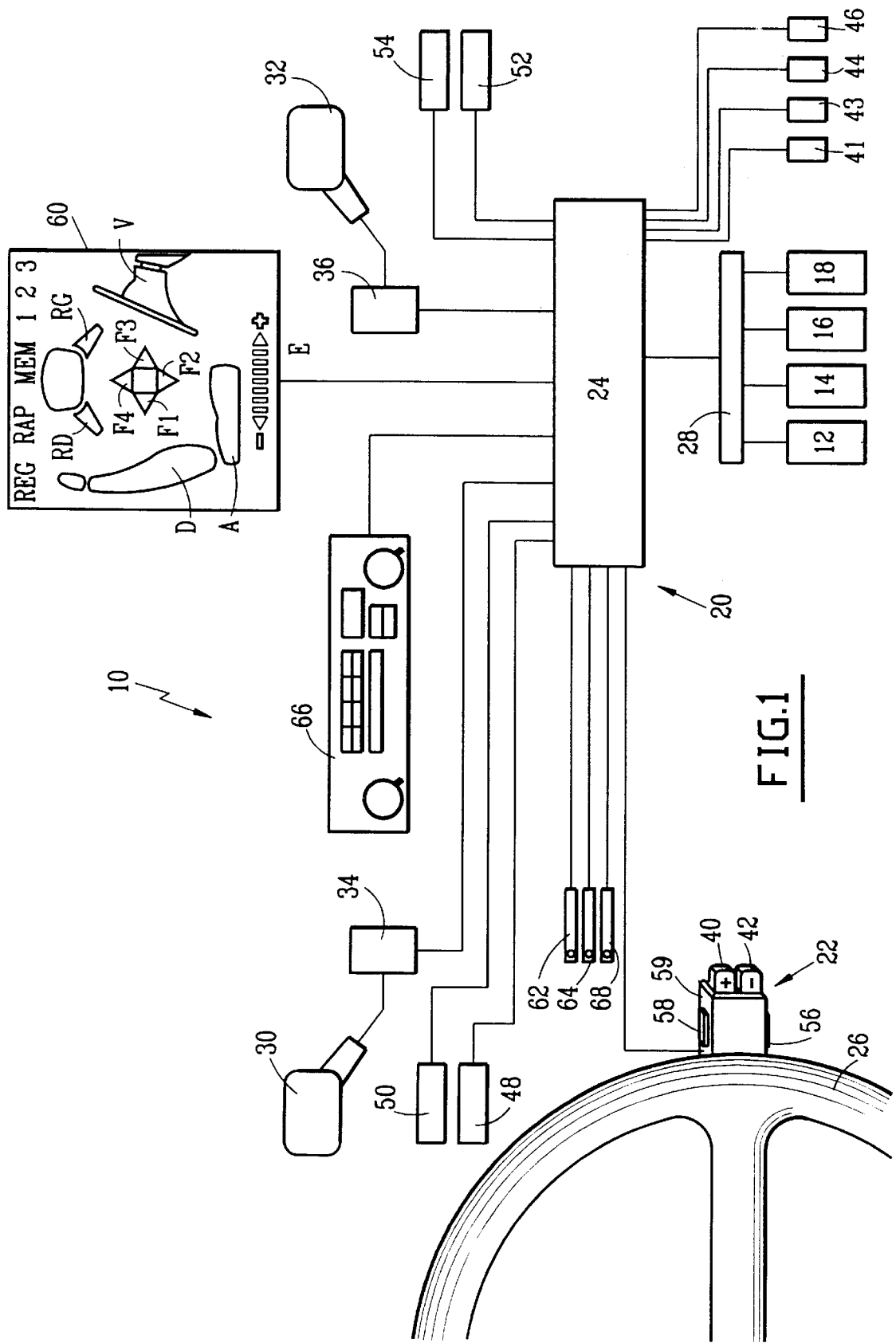
FIG. 1 is a schematic view of the adjustment system of the invention.

FIG. 1 shows a system 10 in accordance with the invention for adjusting the position of various elements of an automobile vehicle. In the example shown in the figures, the system 10 adjusts the position of the seat cushion and the seat squab of a driver's seat, the steering wheel and left and right external rear-view mirrors. There may additionally be provision for adjusting the position of further elements.

In the conventional way, the seat cushion is movable in accordance with a longitudinal first elementary movement in two opposite directions at will, towards the rear and towards the front, and in accordance with a vertical second elementary movement in two opposite directions at will, upwards and downwards. The seat squab is movable in accordance with a tilting elementary movement in two opposite directions at will, towards the front and towards the rear.

The steering wheel and the rear-view mirrors are also movable in accordance with one or two elementary movements, each of these movements being effected in two opposite directions at will.

The elementary movements associated with the various elements are executed in a manner that is known in itself with the aid of electromechanical drive means including electric drive motors.

FIG. 1 includes a schematic representation of an electric motor 12 for adjusting the inclination of the seat squab, an electric motor 14 for longitudinal adjustment of the seat cushion and two electric motors 16, 18 for vertical adjustment of the seat cushion.

The adjustment system 10 includes a control device 20 common to all the elements to be adjusted and including a control system 22 comprising five electric switches and a microprocessor unit 24 to which the control system 22 is connected. The unit 24 provides various control and adjustment functions that will be explained hereinafter.

The control system 22 is placed near the steering wheel 26 of the vehicle so that the switches integrated into the control system are easily accessible to a driver in the driving position. The control system is preferably carried by a steering column to which the steering wheel is connected.

As an alternative to this, the control system 22 can be integrated into the steering wheel.

The electric motors 12 through 18 are connected to the microprocessor unit 24 by means of a conventional electronic circuit card 28.

FIG. 1 also includes a schematic representation of the left and right exterior rear-view mirrors 30, 32. The position of each rear-view mirror 30, 32 is adjusted by means of a pair of electric motors, not shown, connected to the microprocessor unit 24 by means of a conventional electronic circuit card 34, 36.

Various means for control and adjustment of elements including the microprocessor unit 24 and electric switches connected to that unit will be described hereinafter.

The control device 20 includes means for adjusting the position of the elements including, on the one hand, means for selecting an element to be adjusted and an elementary movement of that element and, on the other hand, means for executing the selected movement in a chosen direction.

Figure 2:
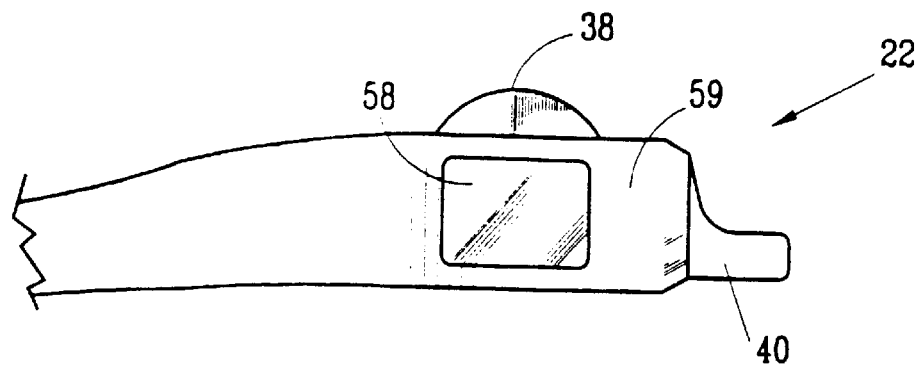
FIG. 2 is a detailed plan view of the control system including the electric switches.

The means for selecting the element to be adjusted include an electric switch 38, shown in FIG. 2, integrated into the control system 22. As shown in FIG. 2, this switch 38 is, for example, a rotary switch with multiple indexed positions, each position of the switch corresponding to the selection of an element to be adjusted and an elementary movement of that element.

The means for executing the selected movement include two switches 40, 42 integrated into the control system 22 and respectively corresponding to the two directions in which the elementary movement can be executed.

The adjustment device 20 also includes means for storing at least two positions of a unit and means for selecting a stored position. These storage and selection means include the microprocessor unit 24 to which memory units 41 through 54 are connected.

A memory unit is associated with each electric motor. Thus the memory units 41 through 46 are associated with the electric motors 12 through 18 for adjusting the seat squab and the seat cushion of the seat and the memory units 48 through 54 are associated with the pairs of motors for adjusting the rear-view mirrors 30, 32.

The position storage means include the switch 38, forming a switch for selectively recalling a memory, and an electric switch 56 for storing a position of the selected element, the latter switch 56 also being integrated into the control system 22.

The means for selecting a stored position include the switch 38, forming a selective memory recall switch, and the switch 56, forming a switch for activating the stored position.

Some of the switches being common to more than one of the position adjustment means, the position storage means and the stored position selection means, the control device 20 is provided with means for selective activation of the adjustment means in an "adjustment" mode, the storage means in a "storage" mode and the stored position selection means in a "recall" mode.

The activation means include an electric switch 58 integrated into the control system 22.

The control system 22 includes a prism-shape box 59 on which the various switches of the system 22 are arranged.

The rotary switch 38 is on a rear face of the box 59, the two switches 40, 42 are on an end face of the box 59 and the other two switches 56, 58 are respectively on the bottom face and the top face of the box 59.

The adjustment system 10 also includes means for displaying information indicating the selected element to be adjusted, the selected elementary movement, the direction of execution of the selected movement and the position of the selected member.

The display means preferably include a screen 60 for displaying pictograms as shown in FIG. 1. The screen 60 is of the liquid crystal type, for example.

The screen 60 is advantageously located on the instrument panel of the vehicle.

The pictograms symbolize a seat having a seat cushion A and a seat squab D, a steering wheel V, a right exterior rear-view mirror RD, a left exterior rear-view mirror RG, four arrows F1 through F4 indicating the direction of execution of the elementary movements and a linear graduated scale E indicating the position of an element relative to its extreme positions.

Note that some of the information displayed on the screen 60 is optional, including the direction of execution of the selected movement and the position of the selected element.

To enable a user to take their place easily in the seat, the adjustment system 10 includes means for positioning the seat cushion and the seat squab in a standard position including an electric switch 62 separate from the control system 22 and connected to the microprocessor unit 24.

The switch 62 is preferably located near the door providing access to the seat, so that a user can operate it before taking their place in the seat. Thus the user can place the seat in a standard position for easy access should the previous user have left the seat in an extreme position where access is difficult.

To prevent unintentional movement of the seat when the vehicle is in motion, the adjustment system 10 includes means for selecting a pulsed or continuous depression mode of operation of the stored position activation switch 56. The selection means include a safety electric switch 64 separate from the control system 22 and connected to the microprocessor unit 24. This switch 64 is actuated by the handbrake of the vehicle, for example.

The adjustment system 10 optionally includes means for allocating the control device 20 either to adjusting the position of the movable elements or to controlling at least one other non-movable element such as a car radio 66 connected to the microprocessor unit 24. The allocating means include an electric switch 68 connected to the microprocessor unit 24 and possibly separate from the control system 22.

One example of an operating sequence of the adjustment system of the invention will be described hereinafter.

Before getting into the driving seat the driver operates the switch 62 to move the seat to the standard position. The driver then has easy access to the latter.

Once seated, the driver operates the switch 68 to allocate the control device 20 to adjusting the position of the various movable elements, including the seat cushion and the seat squab of the seat.

Figure 3:
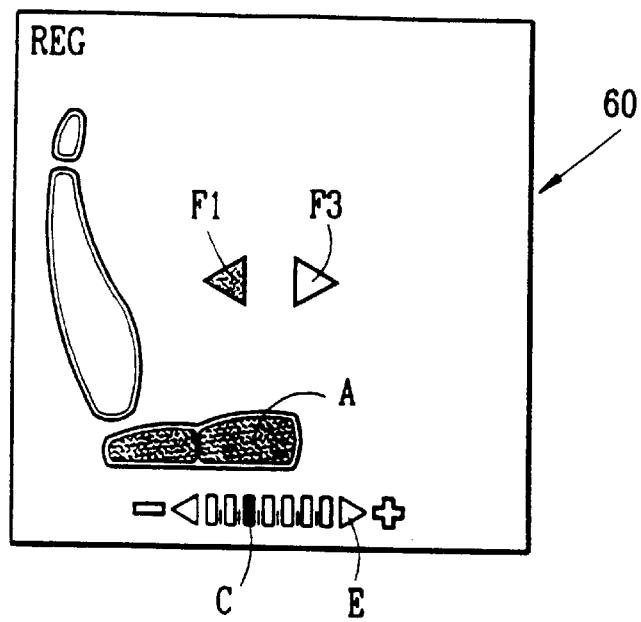
FIG. 3 through 10 are views of the display screen in various adjustment situations.

The microprocessor unit 24 then selects the adjustment mode automatically and displays on the screen 60 pictograms relating to the longitudinal adjustment of the seat, as shown in FIG. 3. The pictogram representing the seat is then seen on the screen 60 with the seat cushion A, which is shown shaded, the longitudinal adjustment arrows F1, F3 and the scale E including a shaded cursor C. The adjustment mode is indicated by the "REG" at the top of the screen.

The end switches 40, 42 are operated to move the seat cushion A forwards or backwards. Depending on the direction in which the seat cushion is moved, the arrow F1 or F3 is shaded and blinks.

During adjustment of the longitudinal position of the seat cushion the cursor C moves along the graduations on the scale E to indicate the position of the seat cushion relative its extreme positions.

Figure 4:
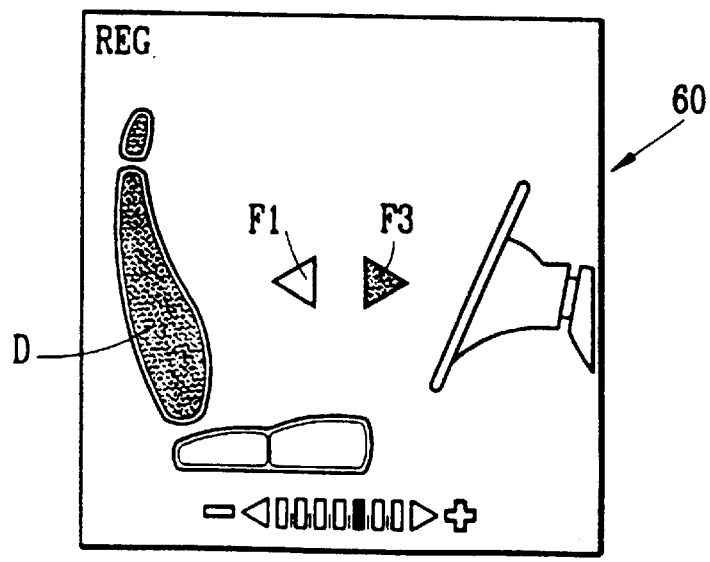

Moving the rear switch 38 selects the next element to be adjusted, namely the seat squab D of the seat, which is then shown shaded. The inclination of the seat squab is adjusted in a similar manner to adjusting the longitudinal position of the seat cushion using the two ends switches 40, 42 (see FIG. 4).

Figure 5:
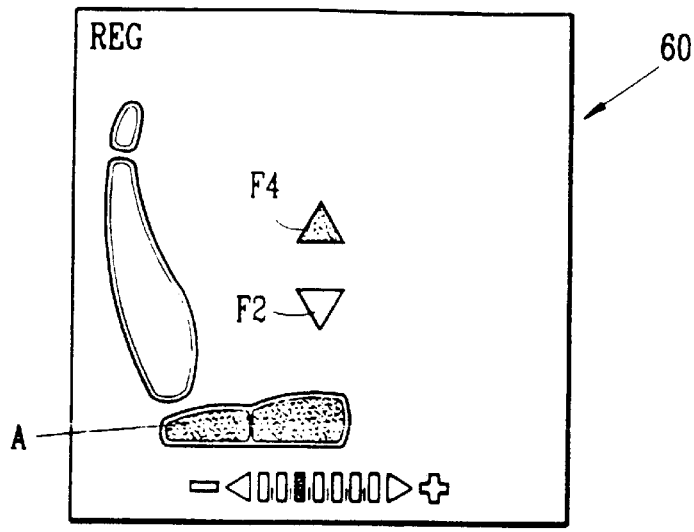

Moving the rear switch 38 further in the same direction as previously selects vertical adjustment of the seat cushion. The seat cushion A is again shown shaded, but this time the seat cushion vertical adjustment arrows F2, F4 appear on the screen 60, as shown in FIG. 5.

Moving the rear switch 38 still further in the same direction successively selects the various elements to be adjusted and their elementary movements (vertical movement, horizontal movement, tilting movement, etc). The rear switch 38 can of course be moved in the opposite direction to return to a previous adjustment.

Note therefore that the rear switch 38 imposes a logical sequence for carrying out the various position adjustments.

Figure 9:
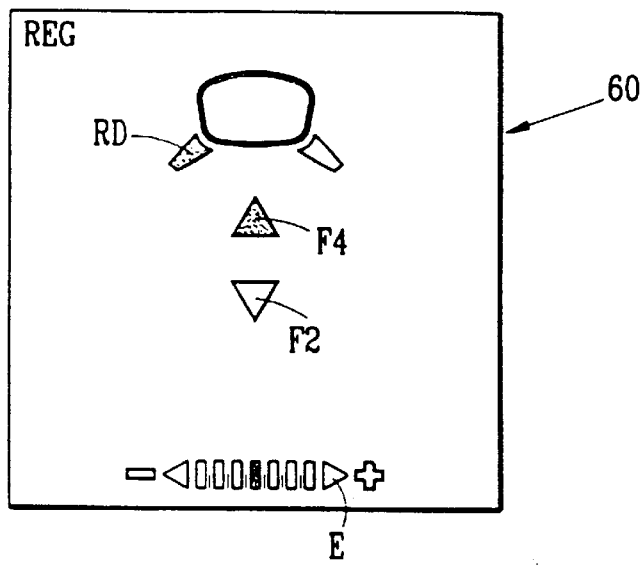
Figure 10:
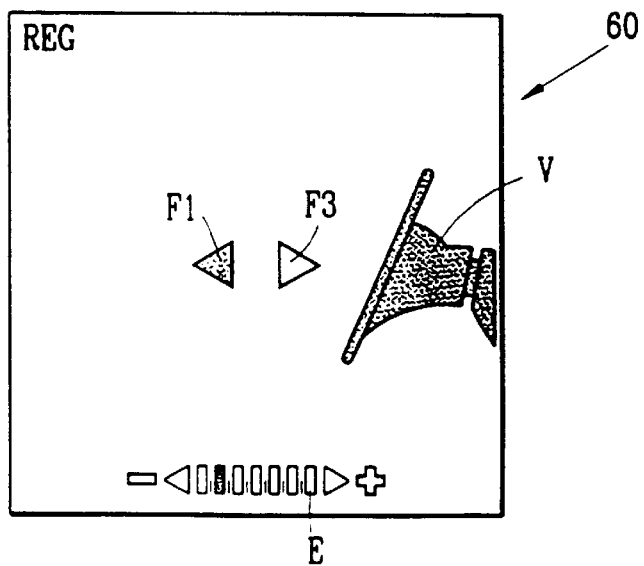

FIG. 9 shows the pictograms appearing on the screen when adjusting the position of the right exterior rear-view mirror and FIG. 10 shows the pictograms appearing on the screen when adjusting the position of the steering wheel.

Moving the rear switch 38 in one direction or the other scrolls through the various possible adjustments in one direction or the other. As an alternative to this, the various adjustments can be scrolled through by operating the two end switches 40, 42 simultaneously. In this case, successive actuations of the two switches 40, 42 at the same time select different elements to be adjusted and their elementary movements.

In the example described the adjustment system includes three memories for storing positions of the adjustable elements. The procedure for storing the position of an element, for example the seat cushion, is as follows.

Figure 6:
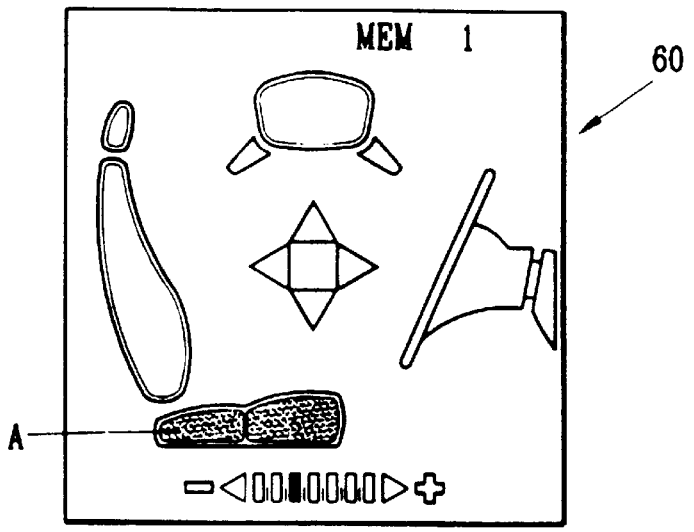

Having determined the position to be stored, the user switches from adjustment mode to storage mode by operating the top switch 58 twice. "MEM 1" appears at the top of the screen 60, as shown in FIG. 6. In this case the seat cushion A is shown shaded. Moving the rear switch 38 selects one of the three memories. Operating the bottom switch 56 then stores the position of the seat cushion in the selected memory. Operating the bottom switch 56 simultaneously commands return to the adjustment mode and can be accompanied by an audible "beep".

Figure 7:
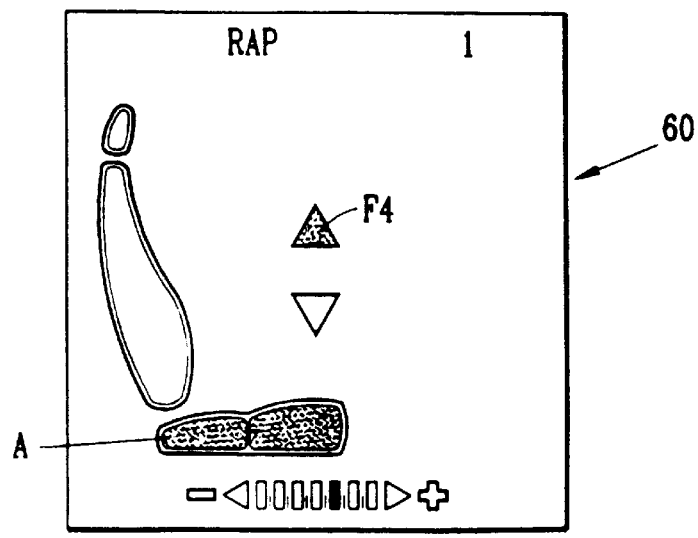
Figure 8:
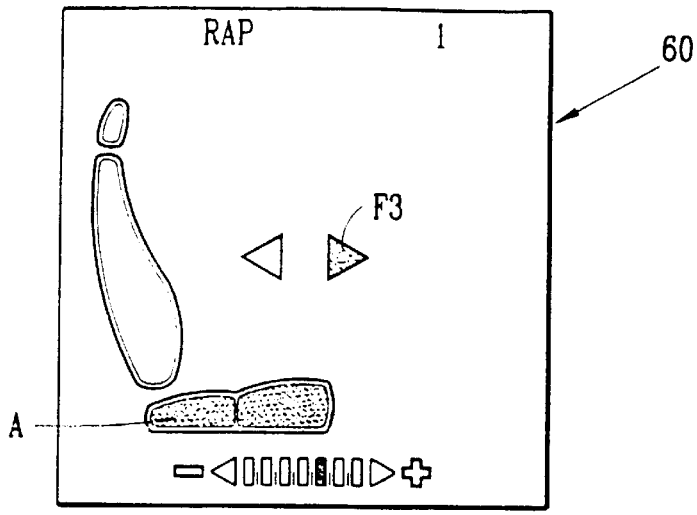

To select a stored position the recall mode is activated by pressing the top switch 58 once. "RAP 1" then appears at the top of the screen 60, as shown in FIGS. 7 and 8. The rear switch 38 is then moved to recall the required memory and the bottom switch 56 is then operated to activate the selected stored position. As in the storage mode, operating the bottom switch 56 simultaneously commands return to the adjustment mode and can be accompanied by an audible "beep".

The pictograms on the screen then indicate the movements of the elements towards their activated stored position and that position. In FIG. 7 the seat cushion returns to its stored position by moving upwards. In FIG. 8 the seat cushion returns to its stored position by moving forwards.

Note that when the vehicle is stopped, with the handbrake engaged, the switch 64 is in a position selecting a pulsed operating mode of the bottom switch 56 for activating the stored position. Accordingly, operating the switch 56 causes the corresponding element to be moved towards its stored position, even after releasing the switch 56.

In contrast, when the vehicle is in motion, the handbrake is disengaged and the switch 64 is in a position selecting a continuous depression mode of operation of the bottom switch 56. In this case, the movement of the corresponding element towards its stored position is interrupted as soon as the bottom switch 56 is released.

In this way it is possible to prevent unwanted movement of one of the elements of the seat towards a stored position when the driver is seated in the seat and the vehicle is in motion.

The invention has many advantages.

The driver can adjust the seat while seated by operating the switches of the control assembly with the fingertips, the hands remaining on the steering wheel in the driving position.

The screen shows the element being adjusted and the various parameters of the adjustment, enabling the driver to continue to watch the road without disturbing their driving position.

The adjustment system of the invention can adjust the position of a large number of elements by means of a limited number of switches independent of the number of elements to be adjusted.

The adjustment system of the invention enables a logical sequence of adjustment of the position of various elements of the vehicle to be proposed to the driver. This sequence can include the control by the control system of any element, movable or otherwise.

What is claimed is:

1. System for adjusting the position of at least two elements (A, D, RD, RG, V) of an automobile vehicle of the kind in which each element is mobile in accordance with at least one elementary movement in two opposite direction at will, the adjustment system including a common control device (20) for all the elements to be adjusted including means for adjusting the position of the elements, these adjustment means including, means (38), for selecting an element to be adjusted and an elementary movement of that element, and, means (40, 42) for executing the selected movement in a chosen direction, the adjustment system further including means (60) for displaying information indicating the element and the elementary movement selected and means (68) for allocating the control device (20) either to adjusting the position of the movable elements or to controlling at least one other non-movable element, the adjustment system including further means (38; 40, 42) imposing a logical sequence for execution of the various element position adjustments.

2. Adjustment system according to claim 1 wherein the elementary movements are executed by means of electromechanical drive means (12–18, 48–54) and in that the control device includes a control system (22) including electric switches and a microprocessor unit (24) to which the control system and the electromechanical drive means are connected.

3. Adjustment system according to claim 2, wherein the allocation means include an electric switch (68) connected to the microprocessor unit (24).

4. Adjustment system according to claim 2, wherein the control system (22) is disposed near the steering wheel of the vehicle or integrated into the steering wheel so that the switches (38–42, 56, 58) can be operated by the fingers of a driver wise hands remain on the steering wheel.

5. Adjustment system according to claim 2, wherein the selector means include an electric switch (38) for selecting an element and an elementary movement and wherein the means for executing the elementary movement include two electric switches (40, 42) each controlling one direction of execution of the elementary movement, the switches for selecting the element and the direction of movement being integrated into the control system (22).

6. Adjustment system according to claim 5, wherein the selector electric switch (38) is a rotary switch with multiple indexed positions forming the means imposing a logical sequence, movement of this selector switch (38) in the same direction successively selecting the various elements to be adjusted and their elementary movements.

7. Adjustment system according to claim 5, wherein the two electric switches (40, 42) for executing an elementary movement form the means for imposing a logical sequence, simultaneous actuation of these two switches (40, 42) selecting successively the various elements to be adjusted and their elementary movements.

8. Adjustment system according to claim 2, wherein the control device (20) includes means (38, 56) for storing at least two positions of an element and means (38, 56) for selecting a stored position and wherein the storage means include an electric switch (38) for selective recall of a memory and an electric switch (56) for storing a position of the element in that memory, the memory recall and stored position activation switches being integrated into the control system (22).

9. Adjustment system according to claim 2, wherein the control device (20) includes means (38, 56) for storing at least two positions of an element and means (38, 56) for selecting a stored position and wherein the means for selecting a stored position include an electric switch (38) for selective recall of a memory and an electric switch (56) for activating the stored position, the memory recall and the stored position activation switches being integrated into the control system (22).

10. Adjustment system according to claim 2, wherein the control device (20) includes means (38, 56) for storing at least two positions of an element and means (38, 56) for selecting a stored position, wherein some of the switches are common to more than one of the element position adjustment means (38–42), the position storage means (38, 56) and the stored position selection means (38, 56) and wherein the control device (20) includes means (58) for selective activation of the element position adjustment means, the position storage means and the stored position selection means.

11. Adjustment system according to claim 10, wherein the selective activation means include an electric switch (58) integrated into the control system (22).

12. Adjustment system according to claim 2, including mean for positioning at least one element in a standard position comprising an electric switch (62) connected to the microprocessor unit (24).

13. Adjustment system according to claim 2, wherein the control device (20) includes means (38,56) for storing at least two positions of an element and means (38,56) for selecting a stored position and wherein the means for selecting a stored position include an electric switch (38) for selective recall of a memory and an electric switch (56) for activating the stored position, the memory recall and the stored position activation switches being integrated into the control system (22), the adjustment system further including means for selecting a pulsed or continuous depression operating mode of the stored position activation switch (56), said operating mode selector means including a safety electric switch (64) connected to the microprocessor unit (24).

14. Adjustment system according to claim 13, wherein the safety switch (64) is actuated by a handbrake of the vehicle.

15. Adjustment system according to claim 1, wherein the display means (60) also indicate the direction of execution of the selected elementary movement and the position of the selected element.

16. Adjustment system according to claim 1, wherein the display means include a screen (60) for displaying pictograms (A, D, E, RD, RG, V).

17. Adjustment system according to claim 1, wherein the control device (20) includes means (38, 56) for storing at least two positions of an element and means (38, 56) for selecting a stored position.

18. Adjustment system according to claim 1, wherein the elements to be adjusted include seat elements such as a seat cushion (A) and a seat squab (D).

19. Adjustment system according to claim 18, wherein the logical sequence includes in succession longitudinal adjustment of the seat cushion, adjustment of the inclination of the seat squab and vertical adjustment of the seat cushion.

* * * * *